United States Patent
Elswick

(12) 
(10) Patent No.: US 6,416,108 B1
(45) Date of Patent: Jul. 9, 2002

(54) COVER FOR ALL TERRAIN VEHICLES

(76) Inventor: Gerald Elswick, 131 Center Ave., Shrewsbury, WV (US) 25015

( * ) Notice: Subject to any disclaimer, the term of this patent is extended or adjusted under 35 U.S.C. 154(b) by 0 days.

(21) Appl. No.: 09/978,066

(22) Filed: Oct. 17, 2001

Related U.S. Application Data

(63) Continuation of application No. 09/732,865, filed on Dec. 11, 2000, now abandoned.

(51) Int. Cl.[7] ................................................ B60J 1/02
(52) U.S. Cl. .................. 296/96.21; 296/77.1; 296/78.1; 296/210
(58) Field of Search ............................ 296/96.21, 77.1, 296/78.1, 35.3, 210, 78, 79, 102, 104, 105, 107.09, 107.13, 107.14

(56) References Cited

U.S. PATENT DOCUMENTS

| | | | |
|---|---|---|---|
| 2,423,748 A | | 7/1947 | Acheson |
| 3,829,152 A | | 8/1974 | Hobbs |
| 3,834,756 A | * | 9/1974 | Grell ........................ 296/77.1 |
| 3,958,826 A | | 5/1976 | Upton |
| 4,313,517 A | * | 2/1982 | Pivar ........................ 296/78.1 |
| 4,336,964 A | | 6/1982 | Pivar |
| 4,346,725 A | * | 8/1982 | Shaw ........................ 296/210 |
| 4,488,750 A | * | 12/1984 | Gerber ...................... 296/77.1 |
| 4,621,859 A | | 11/1986 | Spicher |
| 4,681,362 A | * | 7/1987 | Taylor ....................... 296/78.1 |
| 4,778,214 A | * | 10/1988 | Fu ............................ 296/78.1 |
| 4,800,986 A | | 1/1989 | Hayes, III |
| 4,819,979 A | * | 4/1989 | Moglia ...................... 296/77.1 |
| 4,944,321 A | | 7/1990 | Moyet-Ortiz |
| 4,950,017 A | | 8/1990 | Norton |
| 5,031,713 A | | 7/1991 | Criscuolo |
| 5,058,943 A | | 10/1991 | Louderback |
| 5,072,987 A | * | 12/1991 | Allen ........................ 296/78.1 |
| 5,174,622 A | | 12/1992 | Gutta |
| 5,203,601 A | | 4/1993 | Guillot |
| 5,297,844 A | | 3/1994 | Haustein |
| 5,310,235 A | | 5/1994 | Seymour et al. |
| 5,458,390 A | | 10/1995 | Gilbert |
| 5,542,732 A | * | 8/1996 | Pollman ..................... 296/77.1 |
| 5,588,690 A | | 12/1996 | Showalter |
| 5,842,732 A | | 12/1998 | Daggett et al. |
| 5,961,175 A | | 10/1999 | Clardy, Jr. |
| 6,199,932 B1 | | 3/2001 | Welsh et al. |
| 6,206,446 B1 | | 3/2001 | Slayden |
| 6,325,441 B1 | * | 12/2001 | Ugolini ...................... 296/78.1 |

* cited by examiner

*Primary Examiner*—Stephen T. Gordon
*Assistant Examiner*—Kiran B. Patel
(74) *Attorney, Agent, or Firm*—Burns, Doane, Swecker & Mathis, LLP

(57) ABSTRACT

An all terrain vehicle includes a vehicle body and a covering mounted thereon. The covering includes a front framework section mounted on the front portion of the body, a rear framework section mounted on the rear portion of the vehicle body, and a top framework section interconnecting the front and rear sections. The front and rear framework sections are disposed in a collapsed folded state and are extendable and erectible, with the top framework section interconnecting the front and rear framework sections. A transparent flexible windscreen can be attached to the front framework section. Top, back, and side covers can be attached to the remainder of the framework, the framework being permanently mounted to the vehicle.

20 Claims, 12 Drawing Sheets

COVER FOR ALL TERRAIN VEHICLES

This application is a continuation of Application Ser. No. 09/732,865, filed on Dec. 11, 2000, now abandoned.

BACKGROUND OF THE INVENTION

The present invention relates to all terrain vehicles (ATV's) and, in particular, to a cover for an all terrain vehicle.

All terrain vehicles are in common use as recreational and utility vehicles due to their ability to travel across virtually any terrain. Such ATV's are open topped and open sided, and thus provide the occupants with maximum visibility but virtually no protection from the elements, such as brush and weather.

It would be desirable to provide an ATV with a cover for protection against the elements. It would also be desirable that the cover require no redesign of the ATV's basic structure and that it be possible to easily retrofit the cover to existing ATV's. It would be further desirable that a framework for the cover not have to be disassembled when deployment of the cover is not desired.

SUMMARY OF THE INVENTION

The invention pertains to an all terrain vehicle which includes a vehicle body having front and rear end portions separated by an occupant seating area. A windscreen assembly is mounted on the vehicle body and comprises a front framework mounted on a front portion of the vehicle body, and a flexible transparent windscreen mounted to the front framework. The front framework is disposed in a collapsed folded state and is extendable and erectible to a position in front of the occupant seating area.

Preferably, an additional framing is provided, including a rear frame section mounted on the rear portion of the vehicle body, and a top frame section interconnecting the front and rear frame sections. In addition to the windscreen, there can be provided a top cover, a back cover, and/or a pair of side covers attached to the additional screening.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF A PREFERRED EMBODIMENT OF THE INVENTION

Figure 1:
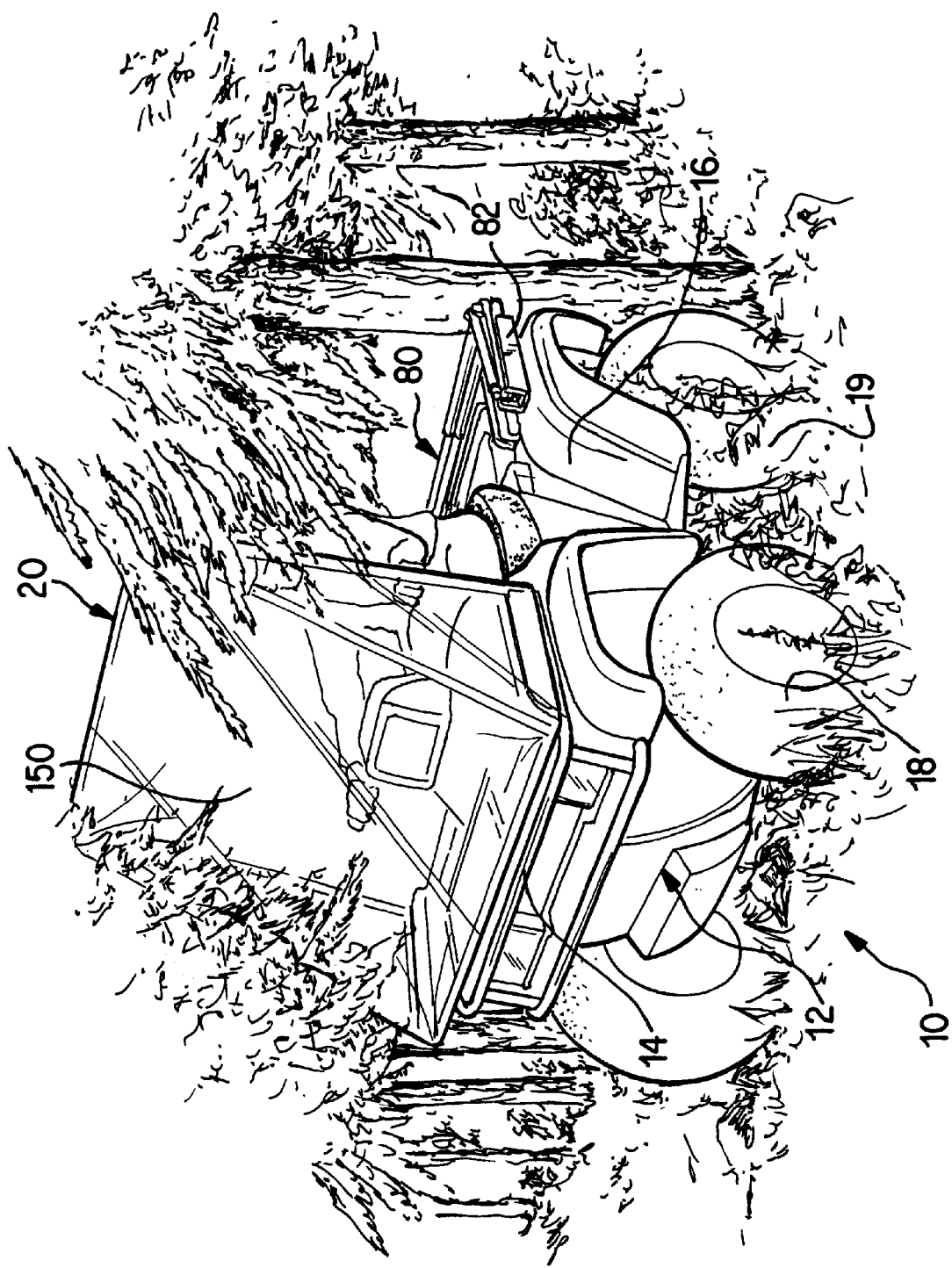
FIG. 1 is a front perspective view of an all terrain vehicle having a framework mounted thereon, and with a windscreen attached to a front section of the framework.

An all terrain vehicle 10 depicted in FIG. 1 comprises a body 12 having front and rear sections 14, 16 separated by a seat area for one or more occupants. The body carries front and rear wheels, 18, 19, the front wheels 18 being steerable. The ATV itself is of conventional structure and thus requires no further description. In accordance with the present invention, a collapsible cover structure 20 is mounted on the frame 12 which can be erected from a collapsed state to provide the occupants with selected protection. That is, the occupants can select any or all of: a windscreen, a top cover, a rear cover, and side covers. Importantly, the cover structure can be retrofit onto existing ATV's.

Figure 2:
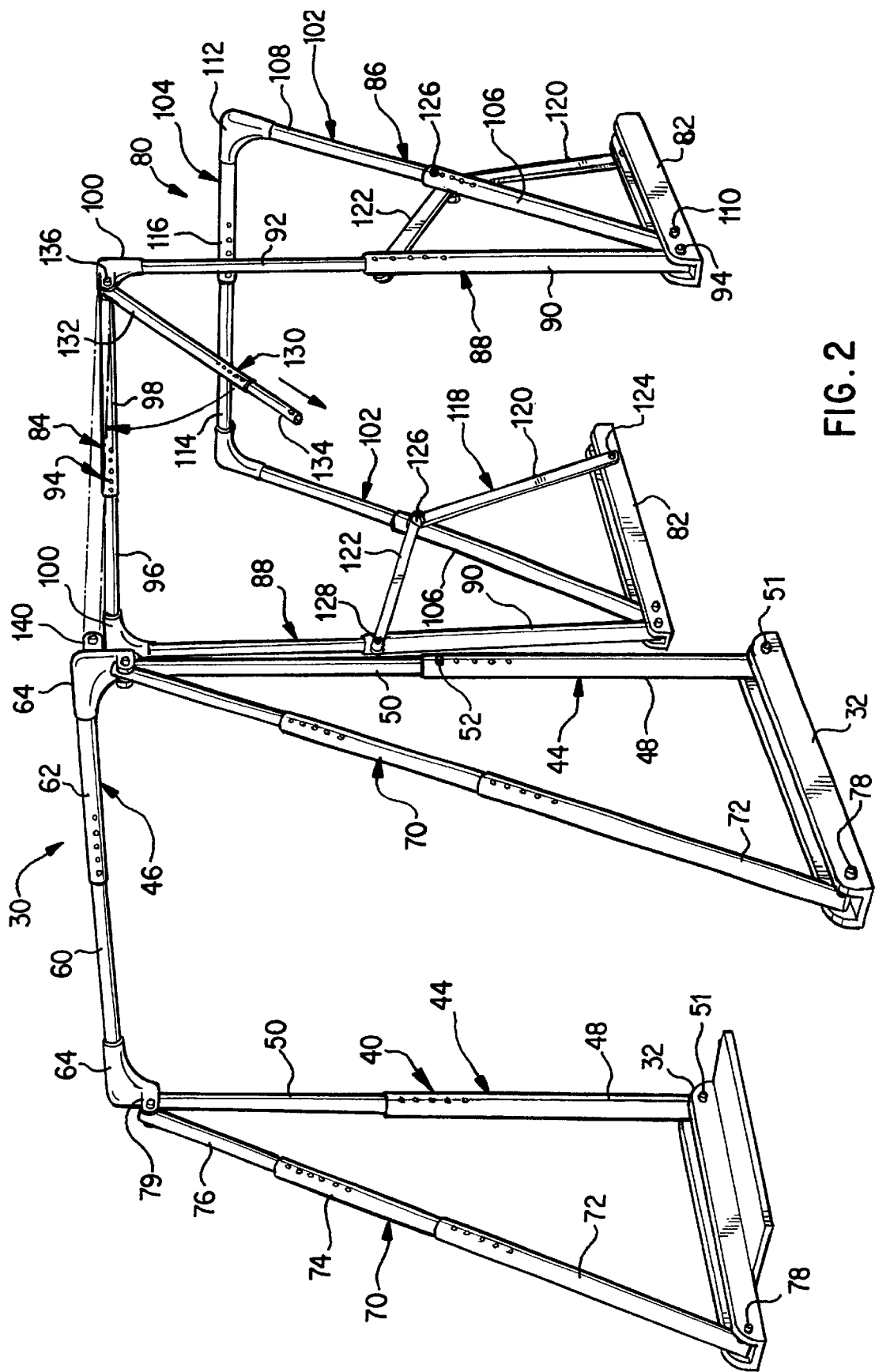
FIG. 2 is a perspective view of the framework in a practically fully extended and erected state.
Figure 4:
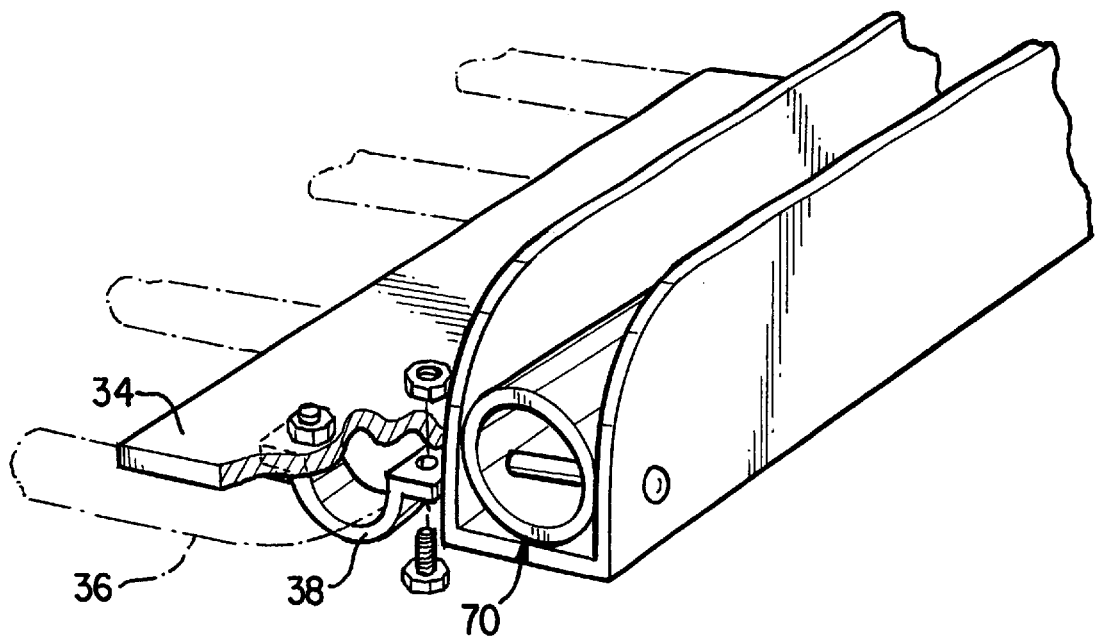
FIG. 4 is a fragmentary view of the front section of the framework of FIG. 3 and partially broken away.
Figure 10:
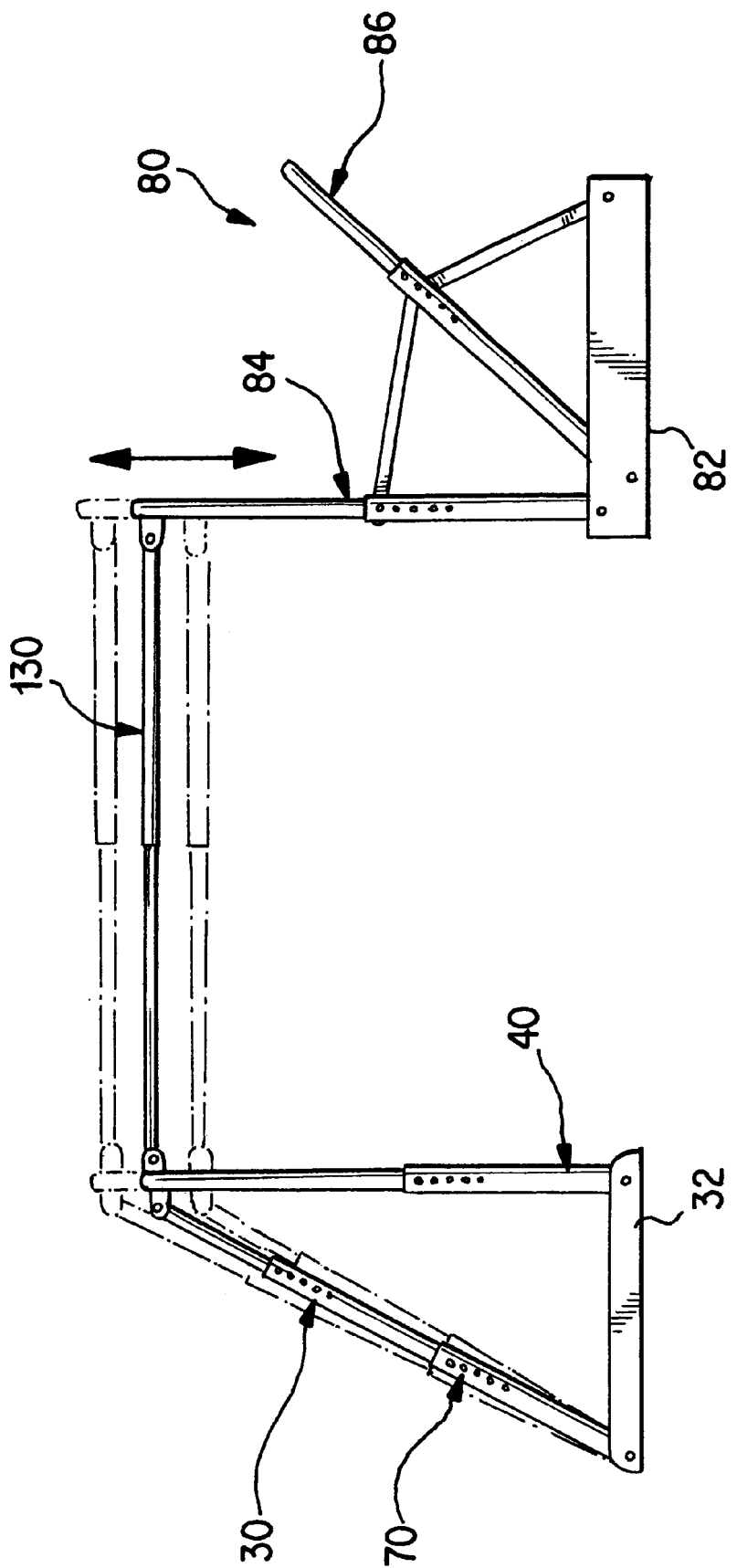
FIG. 10 is a side elevational view of the framework in a fully erected state, showing various positions of adjustment thereof in broken lines.

The cover structure 20 comprises a framework composed of a collapsible front section 30 (see also FIGS. 6 and 10), a collapsible rear section 80 (see also FIGS. 8 and 10), and a collapsible top section 130 (see FIGS. 2 and 10). The front section 30 includes right and left mounting channels 32 (see FIG. 2) of U-shaped cross section that are attached, e.g., by welding, to respective mounting plates 34 that are secured to the top of the front section 14 of the ATV body. Such securement of the mounting channels can be accomplished in any suitable way. One way involves attaching the mounting plates to a horizontal bar 36 commonly provided at the front end of many ATV bodies (see FIG. 4). That attachment is accomplished by positioning a U-shaped bracket 38 beneath the bar 36 and bolting the bracket to the underside of the plate 34 as shown in FIG. 4.

Figure 3:
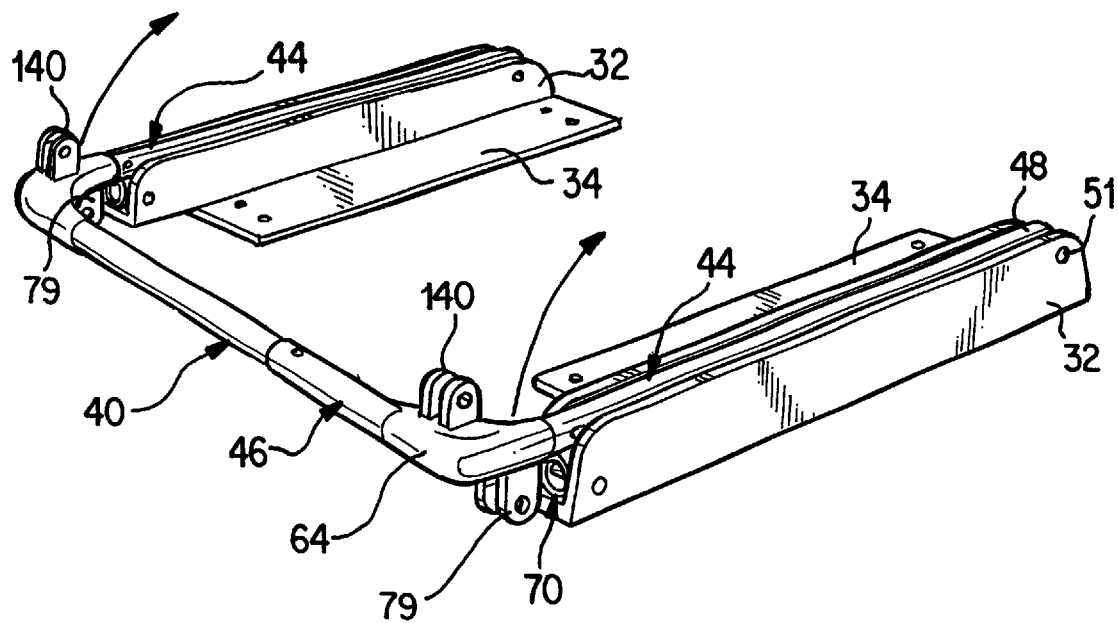
FIG. 3 is a top perspective view of a front section of the framework in a collapsed state.

Housed in the channels 34 are reinforcing struts 70 and parts of a collapsible front sub-frame 40 (see FIG. 3). The front sub-frame includes a pair of parallel arms 44 interconnected by a connecting arm 46. Each arm 44 comprises at least two telescoping tubes 48, 50. One end of each tube 48 is pivotably mounted to a respective channel 32 by a horizontal pivot pin 51. The other end of each tube 48 telescopingly receives one end of one of the tubes 50. The other end of each tube 50 is joined to the connecting arm 46. The telescoping connection between the tubes 48, 50 is adjustable in a way that is conventional for tiles-coping tubes. That is, an inner one of the telescoping tubes (in this case, the tube 50) carries spring-loaded buttons 52 that can be depressed to enable the tube 50 to enter the tube 48. When the buttons 52 become aligned with a pair of holes formed in the outer tube 48, the buttons will automatically snap into those holes to secure the tubes 48, 50 relative to one another. The tubes 48 can be provided with a number of pairs of holes spaced along the length of the tube to enable the length of each arm 44 to be adjustable.

That type of adjustment is available to all sets of telescoping tubes in the framework and thus will not be described for each set.

The connecting arm 46 comprises a pair of adjustable telescoping tubes 60, 62, each carrying an L-shaped connector sleeve 64 at its outer end. Attached in each connector sleeve 64 (e.g., by spring-biased buttons) is an end of one of the tubes 50. When the front sub-frame 40 is in a collapsed state, as shown in FIG. 3, the struts 70 are disposed in respective channels 32, and the arms 44 are collapsed and disposed in respective channels 32 atop the struts 70. The connecting arm 46 extends between the arms 44 outside of front ends of the channels 32.

Figure 5:
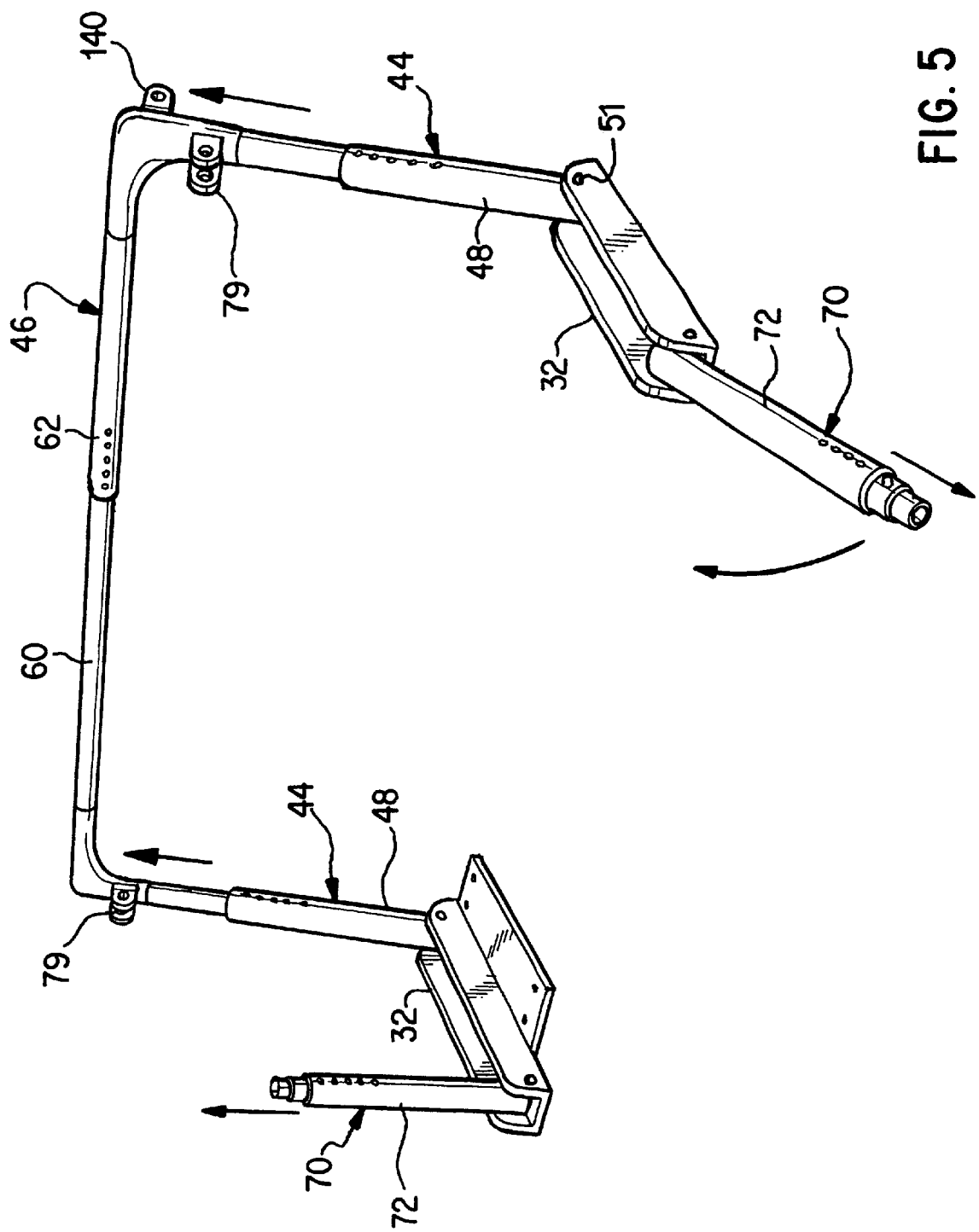
FIG. 5 is a top perspective view of the front section of the framework in a partially erected state.
Figure 6:
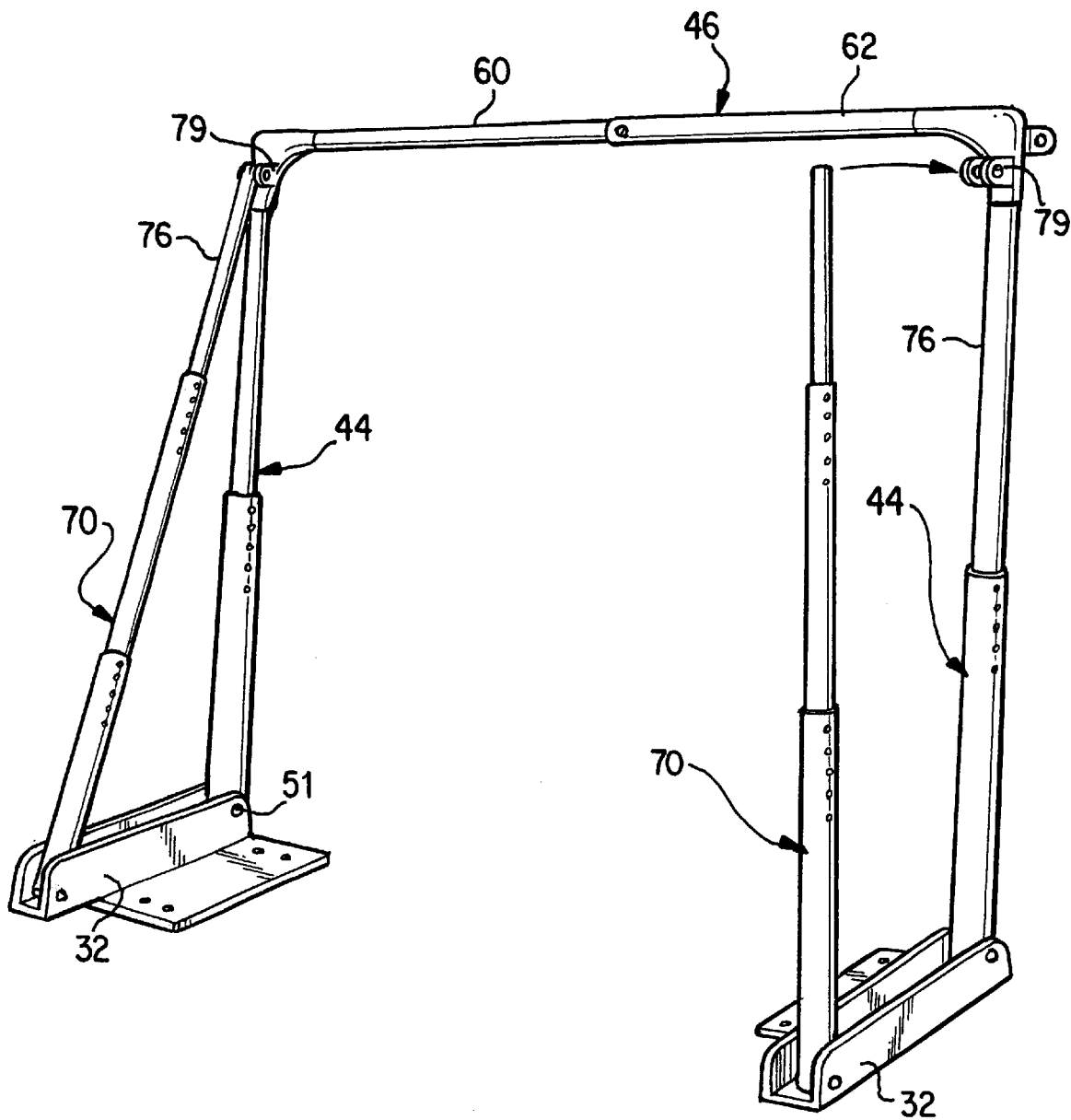
FIG. 6 is a view similar to FIG. 5 with the front section of the framework in an almost completely erected state.

The front sub-frame 40 can be swung upwardly about the pivots 52, and the arms 44 then extended, as shown in FIGS. 5 and 6. The two reinforcing struts 70 hold the front sub-frame 40 in that erected state. Each if the reinforcing struts 70 comprises adjustable telescoping tubes 72, 74, 76. The tubes 72 are pivotably connected to the front ends of respective channels 32 by pins 78. The tubes 76 are adapted to be bolted to brackets 79 carried by the tubes 50 of the sub-frame once the sub-frame 40 has been erected and the struts 70 have been extended. There results a rigid framework adapted to support a windscreen, as will be explained. Also, the struts 70 function as brush guards to deflect branches, etc. away from the windscreen.

Figure 7:
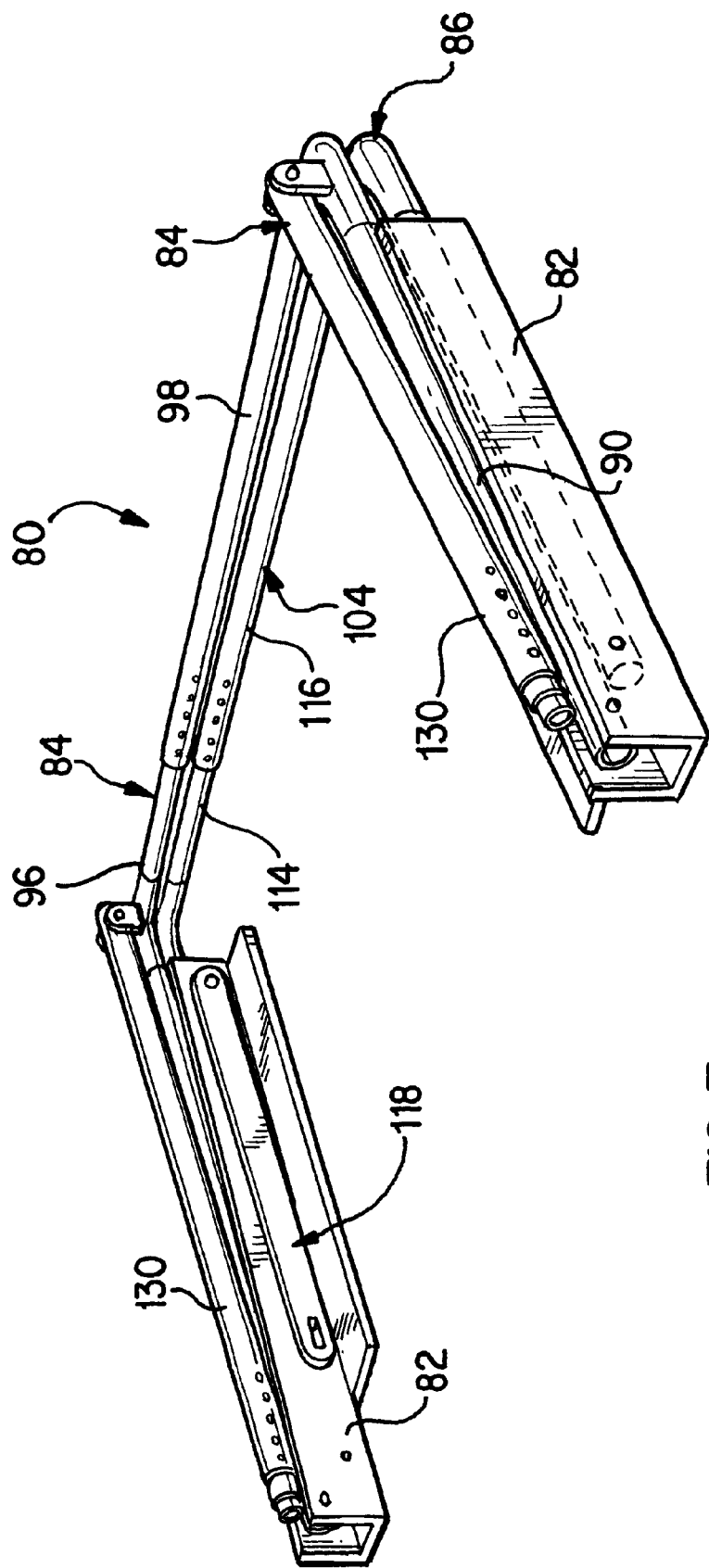
FIG. 7 is a top perspective view of the rear section of the framework in a collapsed state.
Figure 8:
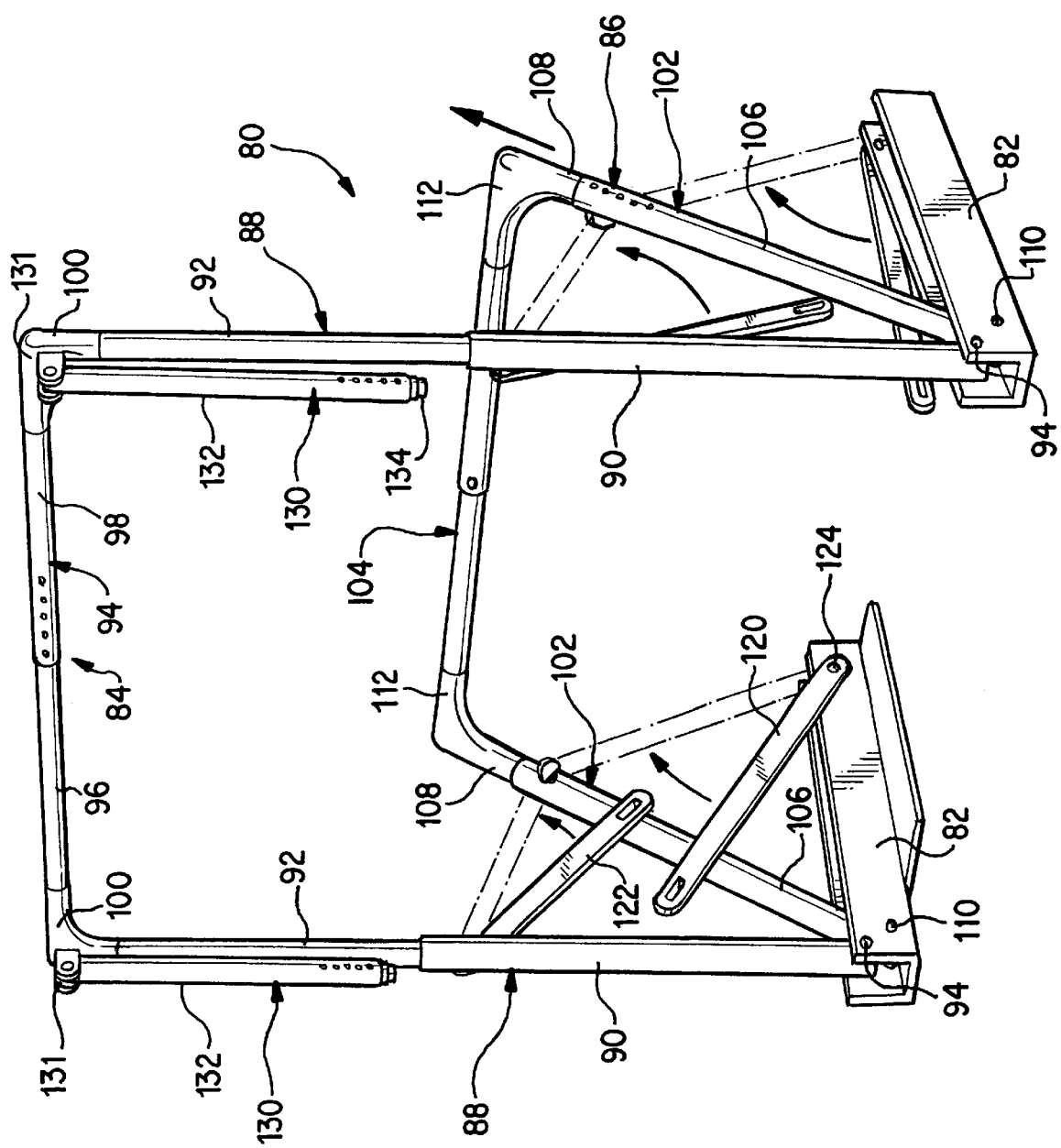
FIG. 8 is a view similar to FIG. 7 with the rear section of the framework in the process of being erected.

As shown in FIGS. 1, 7 and 8, the rear framework section 80 comprises a pair of channels 82 that are similar to the afore-mentioned channels 32 and fixed to the rear section 16 of the vehicle body 12 in any suitable way. Pivotably mounted in the channels 82 are a rear sub-frame 84, and an intermediate sub-frame 86. The rear sub-frame 84 comprises a pair of parallel arms 88, each including a pair of adjustable telescoping tubes 90, 92. One end of each tube 90 is pivotably connected to a front end of each channel 82 by a pin 94. An opposite end of each tube 90 receives one end of a respective tube 92. An opposite end of each tube 92 is connected to a connecting arm 94. The connecting arm 94 comprises adjustable telescoping tubes 96, 98, each carrying an L-shaped connector sleeve 100 to which a respective tube 92 is connected.

The intermediate sub-frame 86 includes a pair of parallel arms 102 and a connecting arm 104. Each arm 102 includes two adjustable telescoping tubes 106, 108. One end of each tube 106 is pivotably attached to a front end of a respective channel 82 by a pin 110 disposed below the pin 94. An opposite end of each tube 106 receives one end of the tube 108. The other end of the tube 108 is connected to an L-shaped connector sleeve 112 that is connected to one of two adjustable telescoping tubes 114, 116 of the connecting arm 104.

Pivotably connected to an inner side of each channel 82 is a brace 118. Each brace 118 includes a pair of bars 120, 122. Each bar 120 is pivotably connected at one end to a respective channel 82 by a pin 124. Each bar 122 is pivotably connected at one end to a respective tube 90 by a pin (not shown).

Figure 9A:
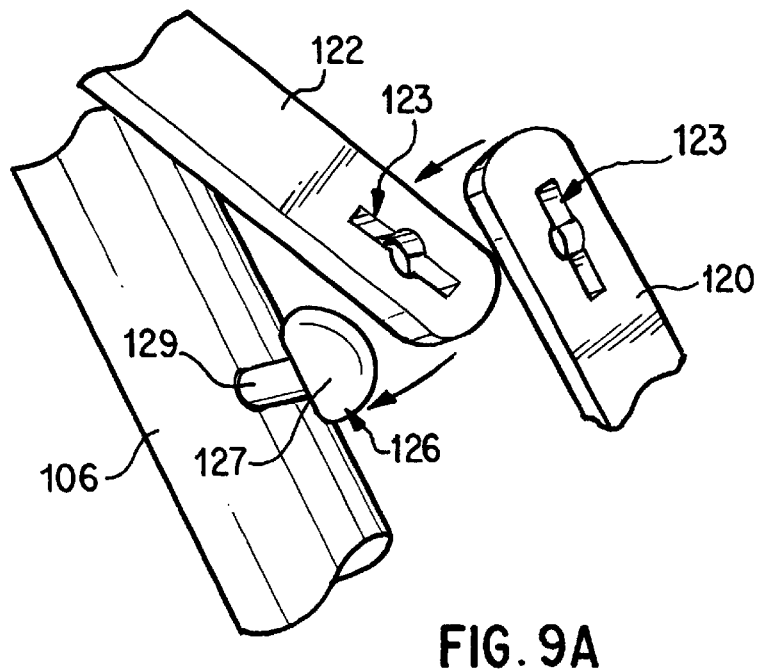
FIG. 9A is a fragmentary sectional view depicting braces of the rear section of the framework in the process of being mounted.
Figure 9B:
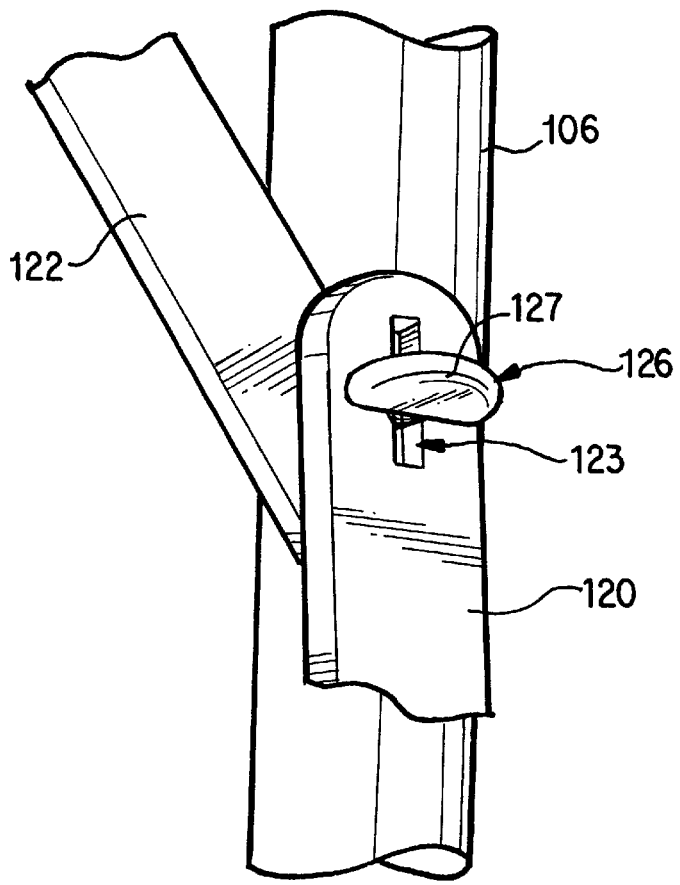
FIG. 9B is a view similar to FIG. 9A after the braces have been mounted.

The other ends of the bars 120,122 include keyways 123 (see FIGS. 9A, 9B) each sized to receive a rotatable key 126 carried by each tube 106. Each key 126 includes a flat head 127 sized to pass through a respective keyway 123, and a cylindrical shaft sized to enter a circular center portion of the keyway. After the rear sub-frame 88 and the intermediate sub-frame 86 have been extended and erected, the brace bars 120, 122 are connected to the keys 126 by passing each key 126 through the aligned slots 123 of a bar 120 and a bar 122, as shown in FIG. 9A. Then, the key is rotated to lock the key in the slots, as shown in FIG. 9B.

Before being extended and erected, the rear sub-frame 84 and the intermediate sub-frame 86 are folded within the channels 82, with the sub-frame 84 disposed atop the sub-frame 86, as shown in FIG. 7. After the rear frame 84 and the intermediate frame 86 have been extended and erected, the braces 118 are swung out and swing out and connected to the tubes 106 and 90 to support those sub-frames in their erected states as shown in FIG. 2.

Pivotably connected to respective sleeves 100 are top arms 130, each comprised of a pair of tubes 132, 134. The top arms 130 define the top section of the framework. One end of each tube 132 is pivotably connected by a pin 136 to ears 131 disposed on a respective connector sleeve 100 (see FIG. 8). The top arms 130 are seated atop respective arms 88 when the rear sub-frame is disposed in a channel 82, as shown in FIG. 7. After the front and rear sub-frames 30, 84 have been erected, the top arms 130 are extended, and the tube 134 is connected to a ears 140 carried by a connector sleeve 64 of the front sub-frame 30 (see FIG. 2).

Once all of the sub-frames 40, 84, 86 have been erected, it is possible to attach protective cover components such as a windscreen (front cover), top cover, side cover, and/or rear cover, as desired.

Figure 11:
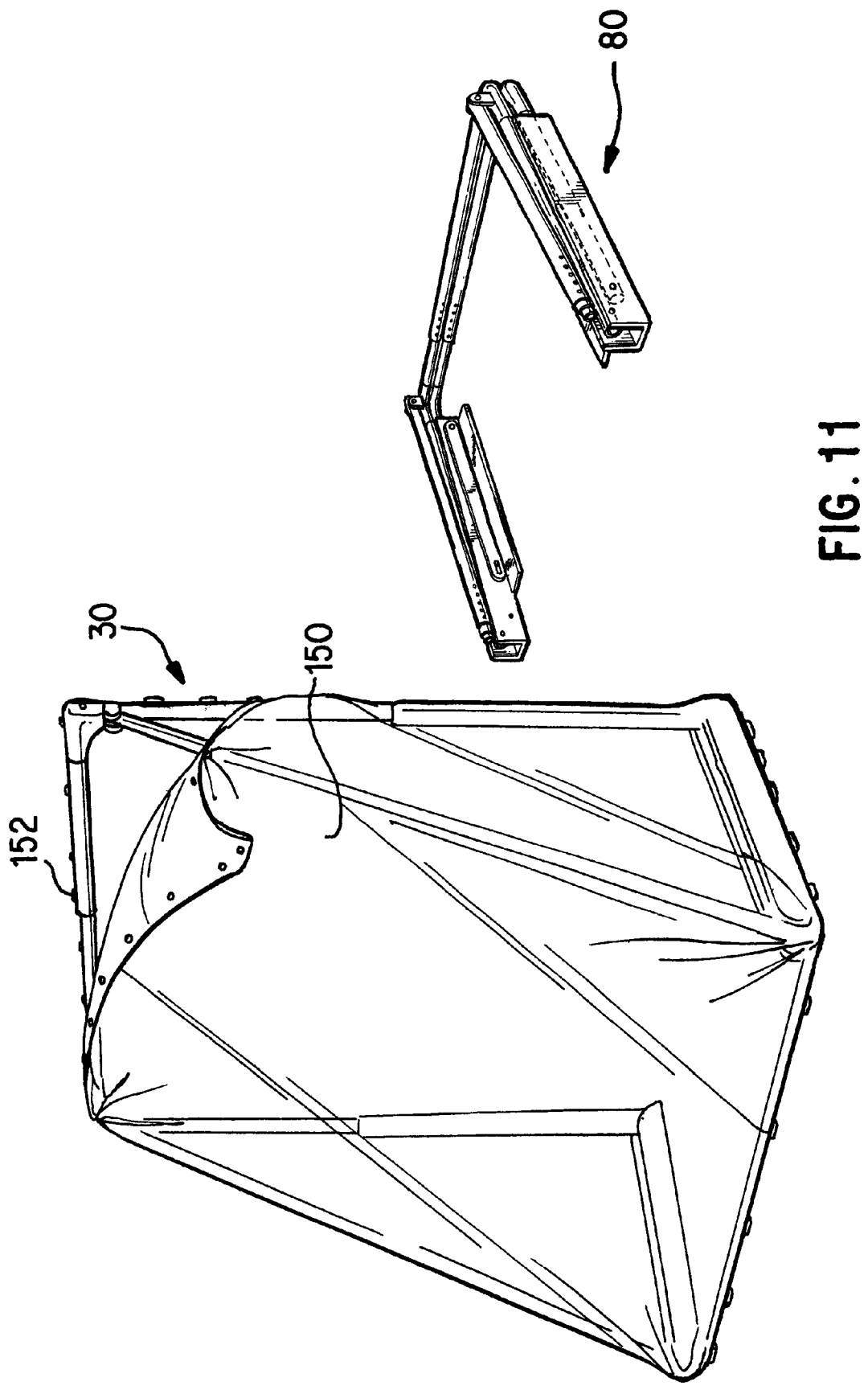
FIG. 11 is a perspective view depicting a windscreen being attached to the erected front section of the framework, and with the rear section of the framework in a collapsed state.

The windscreen 150 is comprised of a conventional flexible transparent plastic, e.g., of the type used in automobile convertibles. That windscreen can be attached in any suitable manner to the front sub-frame 30, such as by the use of snaps 152, as shown in FIG. 11, or by sleeves, Velcro, straps, etc.

Figure 13:
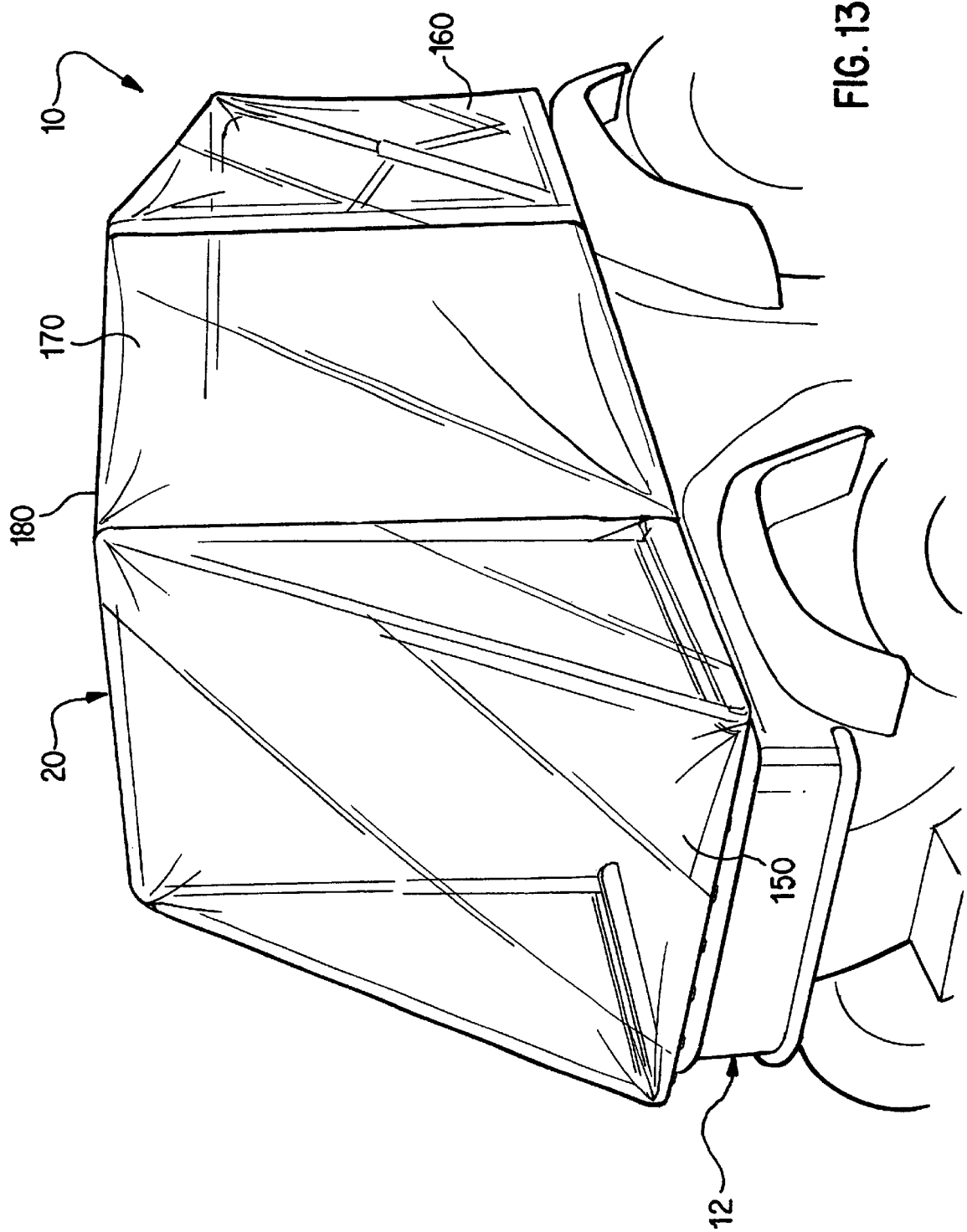
FIG. 13 is a view similar to FIG. 12 showing the vehicle and the side covers rolled down.

Also, a rear flexible cover 160 (see FIG. 13) can be attached to the rear sub-frame 84 and to the intermediate sub-frame 86 by snaps in a similar manner.

Side covers 170 (see FIGS. 12, 13) can be attached to the top arms 130 by snaps or other suitable means.

A horizontal top cover 180 is attachable to the connecting arms (46, 84) of the front and rear sub-frames and to the top arms 130 by any suitable means, e.g., by snaps sleeves, etc.

Figure 12:
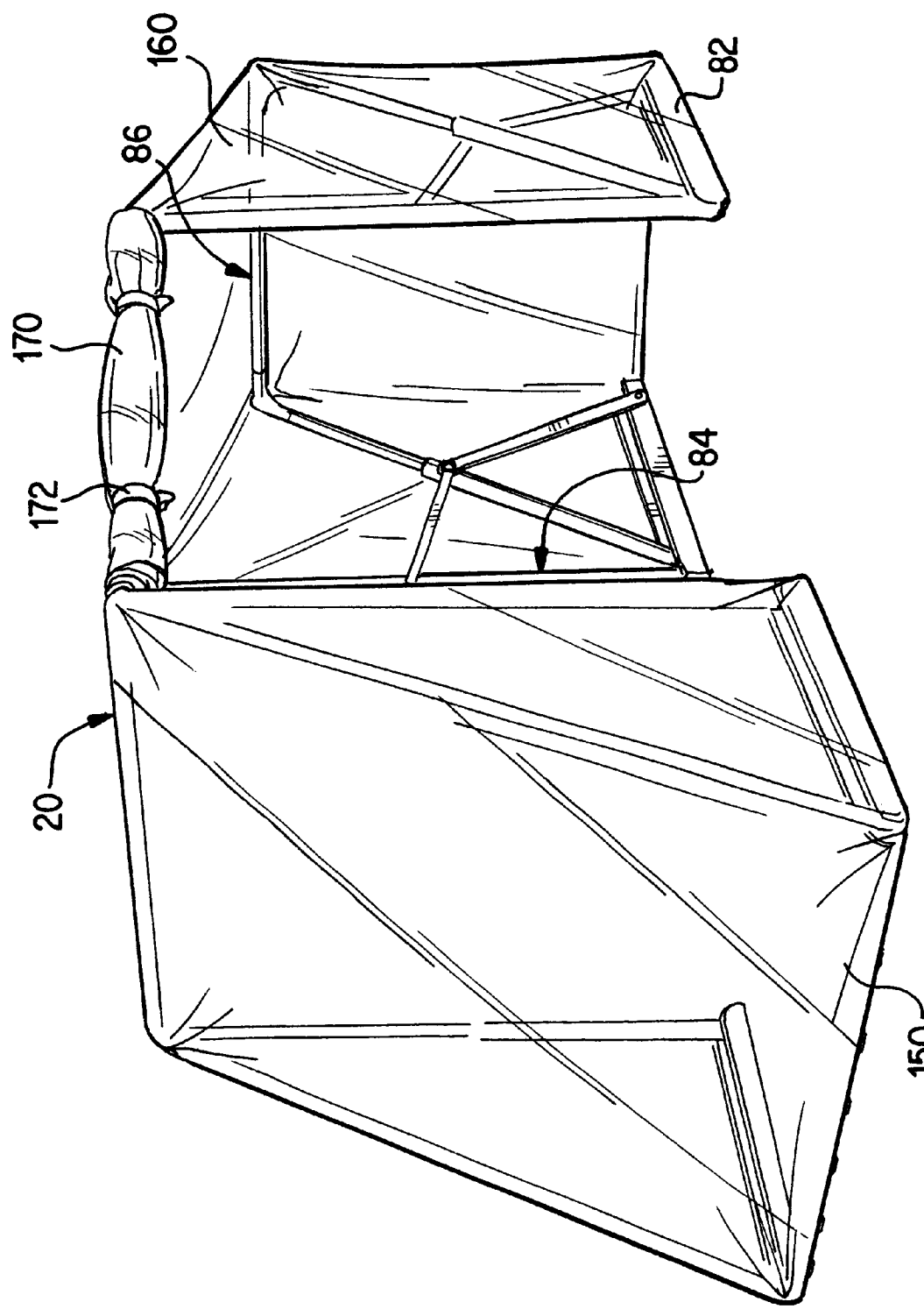
FIG. 12 is a perspective view showing the framework in a fully erected state, and with a windscreen and top, back, and side covers mounted on the framework, and with one of the side covers in a rolled up state.

The side covers 170 can, if desired, be rolled up, and held by suitable straps 172 as shown in FIG. 12.

While the windscreen 150 and the side covers 170 should be formed of transparent material, the top cover and rear cover 160 could be formed of transparent or opaque material.

It will be appreciated that the windscreen 150 and the struts 70 (which function as brush guards) can be employed independently of the top, side and rear covers. In fact, a user could employ only the front section 30 and windscreen. Maximum enclosing of the occupants is, of course, established by also utilizing the rear and top sections 80, 130 and the top cover, the back cover, and the side covers.

If deployment of any of the cover components is not desired, it (they) can be removed from the respective part of the framework, and that framework part can be collapsed and folded up while remaining on the vehicle. That is, it is not necessary to remove the framework from the vehicle, thus simplifying future erection, specifically if the need occurs while the vehicle is on a trail.

It will be appreciated that the present invention provides a simple framework that can be permanently attached to an all terrain vehicle and provided with covers to enable occupants to be shielded from the elements.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An all terrain vehicle comprising:
   a vehicle body having front and rear end portions separated by an occupant seating area; and
   a windscreen assembly mounted on the vehicle body and comprising a front framework mounted on a front portion of the vehicle body, and a flexible transparent windscreen mounted to the front framework, the front framework being disposed in a collapsed folded state and being extendable and erectible to a position in front of the occupant seating area.

2. The all terrain vehicle according to claim 1 wherein front framework includes arms pivotably mounted for up/down rotation, the arms comprising telescoping tubes.

3. The all terrain vehicle according to claim 2 wherein the arms comprise parallel arms, the parallel arms being interconnected by a connecting arm, the connecting arm situated at upper ends of the parallel arms when the parallel arms are erected, wherein the parallel arms and the connecting arm together form a pivotable front sub-frame.

4. The all terrain vehicle according to claim 3 wherein the front framework further includes collapsible reinforcing struts connectible to the front sub-frame when the front sub-frame is in an erected state.

5. The all terrain vehicle according to claim 4 wherein the reinforcing struts are inclined downwardly and forwardly ahead of the parallel arms to function as brush guards.

6. The vehicle according to claim 3 wherein the front framework further includes a pair of channel members attached to the vehicle body, the parallel arms of the front sub-frame being pivotable into and out of the pair of channels.

7. The all terrain vehicle according to claim 1 wherein the front framework includes a pair of struts inclined downwardly and forwardly ahead of the windscreen at opposite ends thereof, to function as brush guards.

8. The all terrain vehicle according to claim 1 wherein the front framework is permanently mounted on the vehicle body.

9. An all terrain vehicle comprising:
   a vehicle body having front and rear end portions separated by an occupant seating area; and
   a covering mounted on the vehicle body, the covering comprising a front framework section mounted on the front portion of the vehicle body, a rear framework section mounted on the rear portion of the vehicle body, and a top framework section interconnecting the front and rear sections, the front framework section being disposed in a collapsed folded state and being extendable and erectible, the rear framework section being disposed in a collapsed folded state and being extendable and erectible, the top framework section interconnecting the front and rear sections, a transparent flexible windscreen attachable to the front framework section, and a top cover attachable to the top framework section.

10. The all terrain vehicle according to claim 9 wherein each of the front and rear framework sections includes arms pivotably mounted for up/down rotation, the arms comprising telescoping tubes.

11. The all terrain vehicle according to claim 10 wherein the arms of the front framework section comprise parallel arms, the parallel arms being interconnected by a connecting arm, the connecting arm situated at upper ends of the parallel arms when the parallel arms are erected, whereby the parallel arms and the connecting arm together form a pivotable front sub-frame.

12. The all terrain vehicle according to claim 11 wherein the front framework section further includes collapsible reinforcing struts connectable to the front sub-frame when the front sub-frame is in an erected state.

13. The all terrain vehicle according to claim 12 wherein the reinforcing struts are inclined downwardly and forwardly ahead of the parallel arms to function as brush guards.

14. The all terrain vehicle according to claim 11 wherein the front framework section includes a pair of channel members attached to the vehicle body, the parallel arms of the front sub-frame being pivotable into and out of the pair of channels.

15. The all terrain vehicle according to claim 14 wherein the arms of the rear framework section comprise parallel arms interconnected by a connecting arm to form a pivotable rear sub-frame.

16. The all terrain vehicle according to claim 15 wherein the rear sub-frame constitutes a first rear sub-frame; the rear framework section further comprising a second pivotable sub-frame formed by parallel arms interconnected by a connecting arm; the first and second rear sub-frames being interconnected by braces when in an erected state, wherein the connecting arm of the first rear sub-frame is disposed above and forwardly of the connecting arm of the second rear sub-frame.

17. The all terrain vehicle according to claim 16, wherein the rear framework section includes a pair of rear channels mounted on the vehicle body; each of the rear channels arranged to receive one of the parallel arms of the first rear sub-frame and one of the parallel arms of the second rear sub-frame.

18. The all terrain vehicle according to claim 16 further including a flexible transparent rear cover attached to the first and second sub-frames.

19. The all terrain vehicle according to claim 9 wherein the front framework section includes a pair of struts inclined downwardly and forwardly ahead of the windscreen at opposite ends thereof, to function as brush guards.

20. The all terrain vehicle according to claim 9 wherein the framework sections are permanently mounted on the vehicle.

* * * * *